(12) United States Patent
Magee et al.

(10) Patent No.: US 6,223,796 B1
(45) Date of Patent: May 1, 2001

(54) PNEUMATIC TIRE HAVING AN OUTER LAYER OF VENEER COVERING THE SIDEWALL

(75) Inventors: Arthur Webster Magee; Teddy Ben Cowling, both of Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/376,134

(22) Filed: Aug. 17, 1999

(51) Int. Cl.[7] .................................................. B60C 13/00
(52) U.S. Cl. .............................................. 152/524; 152/525
(58) Field of Search ................................... 152/524, 525, 152/523, 555, DIG. 12

(56) References Cited

U.S. PATENT DOCUMENTS

| | | | |
|---|---|---|---|
| 4,319,618 | * | 3/1982 | Suzuki ................................. 152/524 |
| 4,929,684 | * | 5/1990 | Roland et al. ........................ 152/525 |
| 5,367,014 | * | 11/1994 | Morehart .............................. 524/526 |
| 5,388,627 | * | 2/1995 | Nakada ................................. 152/525 |

* cited by examiner

*Primary Examiner*—Geoffrey L. Knable
(74) *Attorney, Agent, or Firm*—Bruce J Hendricks

(57) ABSTRACT

A pneumatic tire having an outer-facing sidewall area extending from opposing edges of a belt reinforcing structure to corresponding tire beads, the improvement comprising an outer layer of veneer covering said sidewall in whole or in part and said veneer comprising (a) from 85 to 92 parts by weight of polyisoprene;
(b) from 15 to 8 parts by weight of a styrene-butadiene rubber; and
(c) from 5 to 20 phr of a high styrene resin.

17 Claims, 2 Drawing Sheets

PNEUMATIC TIRE HAVING AN OUTER LAYER OF VENEER COVERING THE SIDEWALL

BACKGROUND OF THE INVENTION

Pneumatic tires and, in particular, off-the-road tires typically suffer from damage including penetration to the sidewall when in use. The purpose of the present invention is to reduce damage to such tires by applying a high durometer veneer over the existing tire sidewall to reinforce the tire. The veneer increases the durability of the tire where the sidewall is exposed to extensive wear, scrubbing or other abuse. Particular applications for tires of the present invention include underground mining, trash refuse haulers and military vehicles.

SUMMARY OF THE INVENTION

The present invention relates to a pneumatic tire having a veneer applied to the outer surface of the sidewall to improve the durability of the tire from puncture.

DETAILED DESCRIPTION OF THE INVENTION

Figure 1:
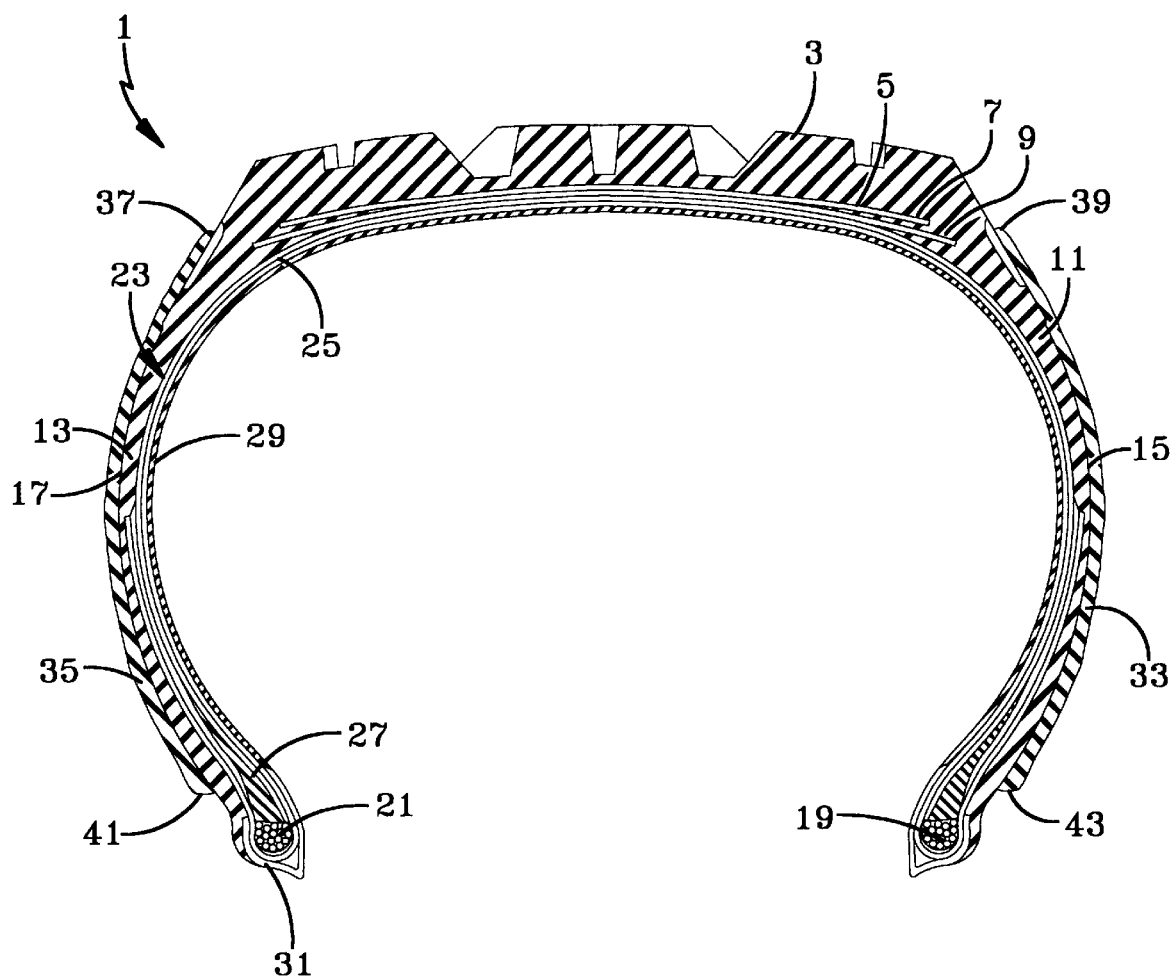
FIG. 1 is a cross-sectional view of a tire according to one aspect of the present invention.

There is disclosed a pneumatic tire having an outer-facing sidewall area extending from opposing edges of a belt reinforcing structure to corresponding tire beads, the improvement comprising an outer layer of veneer covering said sidewall in whole or in part and said veneer comprising (a) from 85 to 92 parts by weight of polyisoprene;

(b) from 15 to 8 parts by weight of a styrene-butadiene rubber; and (c) from 5 to 20 phr of a high styrene resin.

The pneumatic tire 1 of the present invention has a tread and a belt reinforcing structure 5 which comprise at least one circumferentially reinforcing belt 7,9. The pneumatic tire 1 has a pair of sidewalls 11,13 each having an outer facing sidewall area 15,17. The outer facing sidewall area 15,17 extends from opposing edges of the belt reinforcing structure 5 to corresponding tire beads 19,21. The tire is further characterized by a carcass 23 with one or more plies reinforced by biased or radially extending synthetic or metal cords, an apex 27, an air-resistant innerliner 29 and a rubber chafer 31 common in tubeless-type tires. Tube-type tires may also incorporate the veneer described herein.

The pneumatic tire 1 has an outer layer of veneer 33,35 covering the outer facing sidewall area 15,17. The veneer may be applied on one of the outer surfaces 15 or 17 of the sidewall of the tire 1 or may be applied to both sidewall surfaces 15,17 of the tire 1. The veneer may be applied so as to start near the outer area 37,39 of the sidewall near the edge of the belt structure and extend to the outer area 41,43 of the sidewall near the corresponding tire beads 19,21. In accordance with another embodiment, referring to FIG. 2, only a portion of the outer surface 15,17 of the sidewall is covered. In accordance with this embodiment, the veneer extends from a point 45,47 located between the section width line (SWL) and the opposing edges of the belt reinforcing structure 5 to a point 49,51 located between the SWL and outer area of the sidewall near the tire beads 19,21.

Figure 2:
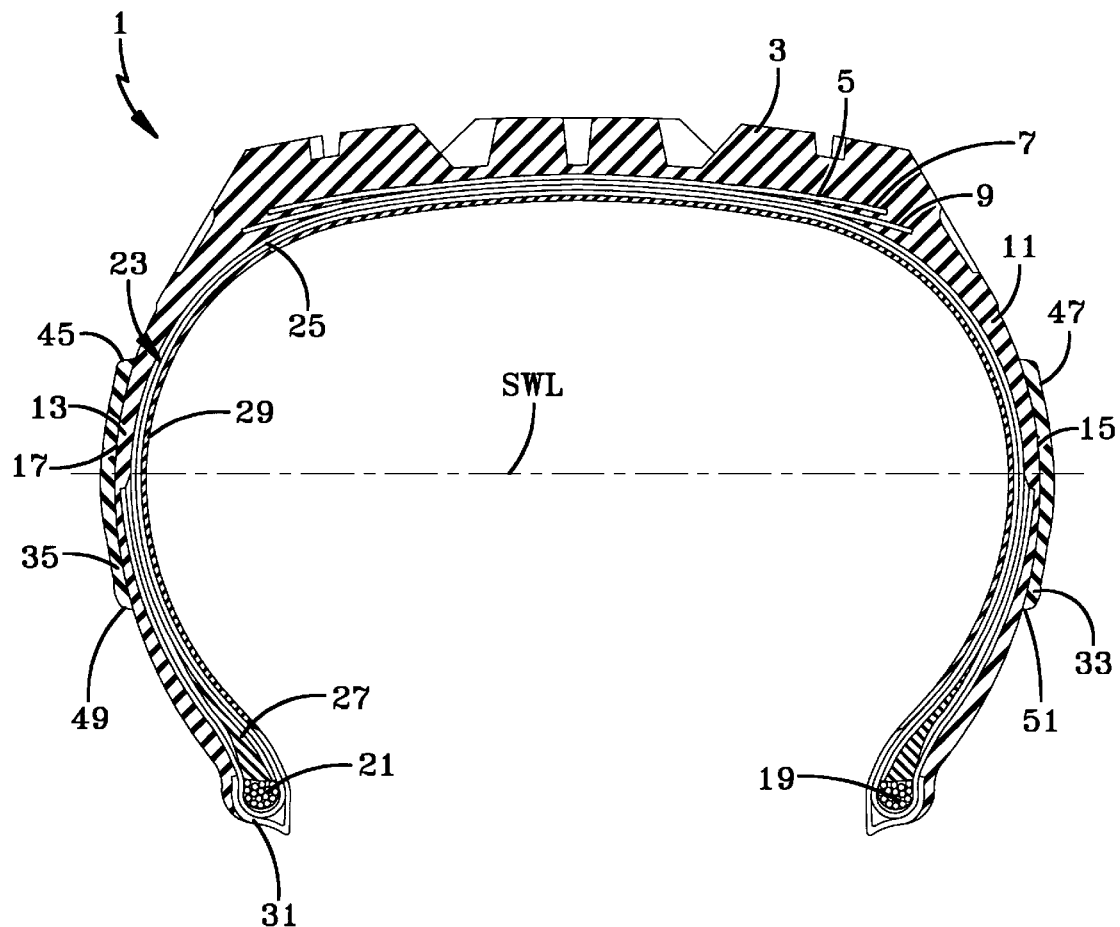
FIG. 2 is a cross-sectional view of a tire according to one aspect of the present invention.

As used herein, SWL means a line parallel in the cross-section of the tire to its axis of rotation and which is located at the tire's point of maximum axial width; ie, at the location at which the tire's section width is measured. The common key to these two embodiments illustrated in FIGS. 1 and 2 is the presence of a veneer covering that portion of the outer surface area 15,17 of the sidewall in the area of the SWL.

The dimensions of the veneer on the sidewall may vary. Generally, the veneer ranges from 2 to 7 inches (5 to 18 cm) in width. The thickness of the veneer may range from 0.125 inch (3.18 mm) to 0.50 inch (12.7 mm).

The veneer 33,35 contains from 85 to 92 parts by weight of polyisoprene. The polyisoprene may be natural or synthetic rubber. Preferably, the polyisoprene is natural rubber. Preferably, the polyisoprene is present in an amount ranging from about 89 to 91 parts by weight.

From 8 to 15 parts by weight of the rubber in the veneer is a styrene-butadiene rubber. Preferably, from 9 to 11 parts by weight is styrene-butadiene rubber. The styrene-butadiene rubber may be emulsion and/or solution polymerization derived styrene/butadiene rubbers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent by weight.

The solution polymerization prepared SBR (S-SBR) typically has a bound styrene content in a range of about 5 to about 50, preferably about 9 to about 36, percent by weight. The S-SBR can be conveniently prepared, for example, by organo lithium catalyzation in the presence of an organic hydrocarbon solvent.

The level of high styrene resin in the overall veneer composition may range from 5 to 20 phr. Preferably, the level of high styrene resin ranges from 10 to 15 phr.

The SBR and high styrene resin may be added separately to the veneer compound or one may use a styrene-butadiene rubber/high styrene resin masterbatch.

The masterbatches for use in the present invention are emulsion masterbatches and comprise from 15 to 50 percent by weight of emulsion SBR and from 85 to 50 percent by weight high styrene resin, with a total weight of available styrene in the resin masterbatch ranging from between 56 to 90 percent. High styrene resin/SBR masterbatches are available from Ameripol Synpol Company, a division of the Uniroyal Goodrich Tire Company as tradename 1903 and 1904. The 1903 material comprises 48 percent by weight SBR 1502 (BR Tq about −100° C., styrene Tq about 100° C.) and 52 percent by weight high styrene resin (Tq about +100° C.) with 56 percent by weight total available styrene in the product. The 1904 material comprises 40 percent by weight SBR 1502 (BR Tq about −100° C., styrene Tq about +100° C.) and 60 percent by weight high styrene resin (Tq about +100° C.) with 60 percent by weight total styrene in the product. An additional commercially available masterbatch may be obtained from The Goodyear Tire & Rubber Company under the designation Pliolite® S6B. Pliolite® S6B comprises about 82.5 percent by weight high styrene resin and about 17.5 percent by weight emulsion polymerized styrene butadiene rubber.

The veneer composition, after cure, may be characterized by a Shore A hardness value of from 75 to 90. Preferably, the value range from 78 to 84. The Shore A durometer values are measured according to ASTM designations D2240.

The veneer composition typically will contain carbon black. The level of carbon black may range from 40 to 80 phr. Preferably, the level of carbon black will range from 50 to 70 phr. Typical carbon blacks which may be used include N110, N121, N220, N231, N234, N242, N293, N299, S326, N330, M332, N339, N343, N347, N351, N358, N375, N539, N660, N683, N754, N762, N765, N774, N908, N990 and N991.

The veneer used in the present invention may optionally contain various rubber additives commonly used in the industry. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of processing oils comprise about 1 to about 10 phr. Such processing aids can include, for example, aromatic, tall oil, naphthenic and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 1 to about 4 phr. Typical amounts of zinc oxide comprise about 2 to about 5 phr. Typical amounts of microcrystalline and paraffinic waxes comprise about 0.5 to about 4 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages; namely, at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and polymeric resin are mixed in one or more non-productive mix stages. The terms "non-productive" and "productive" mix stages are well known to those having skill in the rubber mixing art.

It is contemplated herein that the mixing of the veneer compound may be accomplished in an extruder, calender, Banbury® and the like.

The veneers are applied to a green tire prior to cure or to an already vulcanized pneumatic tire in a manner similar to a retreading process well known to those skilled in the art. For example, the area of the sidewall to where the veneer is to be applied is initially buffed. Thereafter, a cement is applied to the buffed area whereupon a calendered or extruded sheet of veneer is applied to the sidewall surface. optionally, a tread, preferably precured, may be applied at this time. In a conventional manner, an envelope is applied around the casing which is sealed at the bead whereupon the tire is cured in the autoclave.

Vulcanization of the pneumatic tire of the present invention is generally carried out at conventional temperatures ranging from about 100° C. to 170° C. Preferably, the vulcanization is conducted at temperatures ranging from about 100° C. to 150° C. Any of the usual vulcanization processes may be used such as heating in a press or mold, heating with superheated steam or hot air or in a salt bath.

The following examples are presented in order to illustrate but not limit the present invention.

EXAMPLE

A veneer compound was prepared by mixing in a first and second nonproductive stages, 90 parts by weight of natural rubber, 21 parts by weight of Ameripol 1903 (10 parts by weight of emulsion SBR and 11 phr of high styrene resin), 60 parts of carbon black and conventional amounts of zinc oxide, peptizer, stearic acid, processing oil, hydrocarbon resin, wax and processing oil. To this mixture was added a conventional amount of an amine antidegradant and about 4 total phr of sulfur and accelerator. The veneer compound was cured for 45 minutes at 135° C. Table I below lists the physical properties for the cured veneer compound.

TABLE I

| Property | |
|---|---:|
| 300% Modulus[1] (psi) | 1823 |
| Tensile Strength[1] (psi) | 3312.5 |
| % Elongation[1] | 500.5 |
| Shore A Hardness | 78 |
| Specific Gravity | 1.140 |
| $T_1$ (min) | 17.07 |
| $T_{25}$ (min) | 28.88 |
| $T_{90}$ (min) | 58.53 |

The above veneer compound was applied to a 36×12.5 R 16.5 tire. The veneer was first mixed and calendered into a thin film. The film was then covered with a thin layer of polyethylene for storage. The sidewall of the tire was buffed and a cement was applied. After the cement dried, the layer of veneer was applied with pressure. The tire was then wrapped in an envelope and cured using standard retread curing conditions.

What is claimed is:

1. A pneumatic tire having an outer-facing sidewall area extending from opposing edges of a belt reinforcing structure to corresponding tire beads, the improvement comprising an outer layer of veneer covering said sidewall in whole or in part and said veneer comprising (a) from 85 to 92 parts by weight of polyisoprene;
(b) from 15 to 8 parts by weight of a styrene-butadiene rubber; and
(c) from 5 to 20 phr of a high styrene resin.

2. The pneumatic tire of claim 1 wherein said veneer ranges from a thickness of from 3.18 mm to 12.7 mm.

3. The pneumatic tire of claim 1 wherein the Shore A hardness value as determined by ASTM D2220 for the veneer ranges from 75 to 90.

4. The pneumatic tire of claim 1 wherein the level of styrene resin in the veneer ranges from 10 to 15 phr.

5. The pneumatic tire of claim 1 wherein said polyisoprene is natural rubber.

6. The pneumatic tire of claim 1 wherein said high styrene resin and styrene butadiene rubber are added as a masterbatch comprising from 15 to 50 percent by weight of emulsion polymerized styrene butadiene rubber and from 85 to 50 percent by weight of high styrene resin.

7. The pneumatic tire of claim 1 wherein from 89 to 91 parts by weight of natural rubber is present in the veneer.

8. The pneumatic tire of claim 1 wherein from 9 to 11 parts by weight of styrene-butadiene rubber is present in the veneer.

9. The pneumatic tire of claim 1 wherein the styrene-butadiene rubber is an emulsion polymerized derived styrene/butadiene rubber.

10. The pneumatic tire of claim 1 wherein the bound styrene content in the styrene butadiene rubber ranges from 5 to 50 percent.

11. The pneumatic tire of claim 1 wherein the styrene butadiene rubber is solution polymerized derived styrene/butadiene rubber.

12. The pneumatic tire of claim 1 wherein said styrene butadiene rubber and high styrene resin comprise a masterbatch.

13. The pneumatic tire of claim 12 wherein said masterbatch comprise from 15 to 50 percent by weight emulsion SBR and from 85 to 50 percent by weight high styrene resin.

14. The pneumatic tire of claim 13 wherein the total weight of available styrene in the resin masterbatch ranges from 56 to 90 percent.

15. The pneumatic tire of claim 13 wherein said masterbatch comprises about 48 percent by weight SBR and about 52 percent by weight high styrene resin.

16. The pneumatic tire of claim 13 wherein said masterbatch comprises about 40 percent by weight SBR and about 60 percent by weight high styrene resin.

17. The pneumatic tire of claim 13 wherein said masterbatch comprises about 82.5 percent by weight high styrene resin and about 17.5 percent by weight SBR.

* * * * *